United States Patent [19]

Nishizima

[11] 4,426,951

[45] Jan. 24, 1984

[54] TURN SIGNAL CANCELLATION APPARATUS FOR USE WITH STEERING WHEEL AND SHAFT ASSEMBLY

[75] Inventor: Kazuyoshi Nishizima, Shizuoka, Japan

[73] Assignee: Nihon Plast Co., Ltd., Shizuoka, Japan

[21] Appl. No.: 301,575

[22] Filed: Sep. 14, 1981

[51] Int. Cl.³ .............................................. H01H 3/18
[52] U.S. Cl. ........................................ 116/46; 74/567; 200/61.54; 200/61.35
[58] Field of Search .................. 116/31, 36, 35 R, 46, 116/52, 51, 28 R; 200/61.35, 61.54, 61.3; 74/567, 569, 484 R

[56] References Cited

U.S. PATENT DOCUMENTS

| | | | |
|---|---|---|---|
| 2,249,120 | 7/1941 | Doane et al. | 200/61.35 |
| 2,643,308 | 6/1953 | Lincoln et al. | 200/61.35 X |
| 3,852,543 | 12/1974 | Suguki | 200/61.35 X |

FOREIGN PATENT DOCUMENTS

| | | | |
|---|---|---|---|
| 2609306 | 9/1976 | Fed. Rep. of Germany | 116/35 R |
| 2621289 | 11/1977 | Fed. Rep. of Germany | 200/61.35 |
| 552224 | 4/1977 | U.S.S.R. | 116/31 |

*Primary Examiner*—Anthony V. Ciarlante
*Assistant Examiner*—Tom Noland
*Attorney, Agent, or Firm*—Armstrong, Nikaido, Marmelstein & Kubovcik

[57] ABSTRACT

An automotive turn indicator has a turn signal cancellation apparatus mounted on a steering column and wheel assembly. The apparatus comprises a boss cover of a plastic material extending around a steering wheel boss and secured thereto and a turn signal cancellation cam having crests at the opposite ends. The boss cover has cam actuating projections integral therewith and extending from the bottom surface thereof and a reinforcing portion integral with the boss cover and with the cam actuating projections and disposed radially inwardly thereof. The cam actuating projections are movable along a circular path about the axis of the steering shaft when the steering wheel is rotated. The signal cancellation cam is operable by a turn indicator lever so that the crests of the cam are moved into the path of movement of the cam actuating projections whereby the cam can be actuated by engagement of one of the cam actuating projections with one of the crests of the cam.

6 Claims, 9 Drawing Figures

TURN SIGNAL CANCELLATION APPARATUS FOR USE WITH STEERING WHEEL AND SHAFT ASSEMBLY

BACKGROUND OF THE INVENTION

1. Field of the Invention

The present invention relates to an automotive turn indicator and, more particularly, to a turn signal cancellation apparatus for use with a steering wheel and shaft assembly having a steering wheel boss to which the steering shaft is secured.

2. Description of the Prior Art

The prior art turn indicator will be discussed with reference to FIGS. 1 and 2 of the drawings. A steering wheel (not shown) has a boss a through which a steering shaft b extends and is secured thereto by means of a nut c. The shaft b extends through a steering column d to which a turn indicator base e is secured. A bracket f is pivotable with respect to the base e and carries a turn indicator lever g and a cam h which is resiliently supported at one side by a spring i mounted on the base e and has a pair of crests j disposed at the opposite ends of the cam h. The boss a carries a cam actuating pin k mounted on the bottom surface of the boss. The cam h is operable by the lever g so that either of the crests j of the cam is moved into the circular path l of the movement of the cam actuating pin k. Assuming that a car is to be turned to the left, the lever g is first rotated counterclockwise from the neutral position shown by broken lines in FIG. 2 to the solid line position. The rotation of the lever g causes the bracket f to close contacts of a turn indicator switch (not shown) in conventional manner. The upper crests j is now positioned on the path l of movement of the cam actuating pin k. Then, the steering wheel is rotated counterclockwise to turn the car to the left. When the turn of the car is completed, the steering wheel is rotated clockwise to the initial position. This return rotation of the steering wheel moves the cam actuating pin k along the circular path l so that the pin k is contacted with the upper crest j of the cam h to drive the same whereby the bracket f and the lever g are returned to the initial neutral position and the switch contacts are again opened to cancel the turn signal.

In order that the cancellation mechanism may provide a reliable operation, it must be assured that the cam actuating pin k be moved accurately along a predetermined path of movement l. Thus, the cam actuating pin k must be carefully driven into a pin receiving hole m in the bottom surface of the boss so that the pin is not inclined to the axis of the hole m. However, there was a tendency that, because the pin k had to be forcibly driven into the hole m, the pin was inclined to the axis of the hole. After the pin was driven into the hole, therefore, a step was required for correcting the position of the pin with respect to the axis of the hole.

The boss a is fixed to the shaft b by tightening the nut c onto the boss a. The tightening force is applied to a tapered inner peripheral surface n of the axial hole in the boss a. The pin receiving hole m is provided adjacent to the tapered inner peripheral surface n. Should the tightening force of the nut c be unduly large, there occurs a possibility that cracks are produced in the bottom surface of the boss between the hole m and the tapered surface n.

SUMMARY OF THE INVENTION

It is a primary object of the present invention to eliminate the problem discussed above.

It is another object of the present invention to provide an improved turn signal cancellation apparatus which is so constructed as to simplify the structure of the steering wheel boss and to render the boss light-weighted.

To achieve the above objects of the invention, there is provided a turn signal cancellation apparatus for use with a steering wheel and shaft assembly having a steering wheel boss to which the steering shaft is secured, said apparatus comprising a boss cover of a plastic material extending around said steering wheel boss and secured thereto, and a turn signal cancellation cam, said boss cover including at least one cam actuating portion integral with said cover and extending from the bottom surface thereof and a reinforcing portion disposed substantially radially inwardly of said cam actuating portion and extending from the bottom surface of said boss cover, said reinforcing portion being integral with said boss cover and said cam actuating portion, said cam actuating portion being movable along a circular path about the axis of said steering shaft when said steering wheel is rotated, said cam having at least one part and being operable by a turn indicator lever so that said part is moved into the path of movement of said cam actuating portion of said boss cover whereby said cam can be returned to its initial neutral position by engagement of said cam actuating portion with said part of said cam.

The above and other objects, features and advantages of the present invention will be made more apparent by the following description of preferred embodiments of the invention with reference to the accompanying drawings.

DESCRIPTION OF PREFERRED EMBODIMENTS

Figure 1:
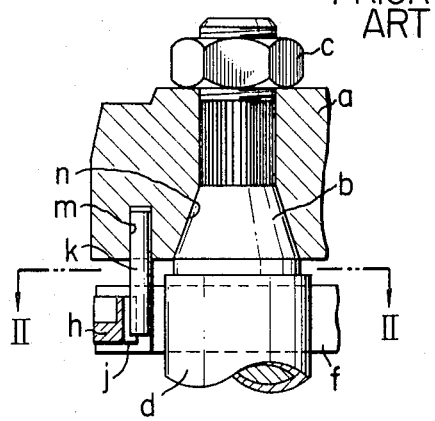
FIG. 1 is a fragmentary axial sectional view of the prior art steering wheel and shaft assembly having a turn signal cancellation apparatus incorporated therein.
Figure 2:
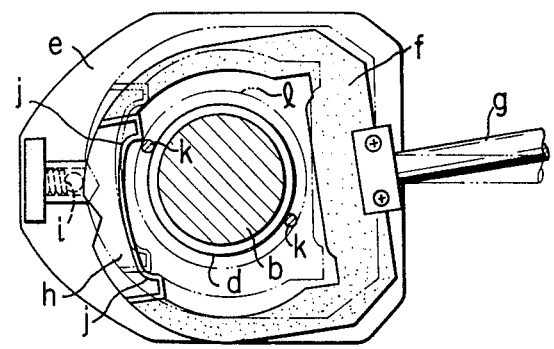
FIG. 2 is a sectional view taken on line II—II in FIG. 1.
Figure 3:
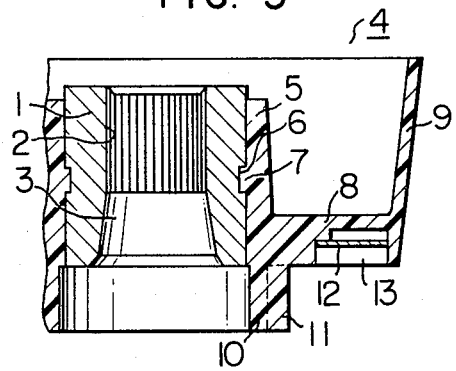
FIG. 3 is a fragmentary axial sectional view of a steering wheel boss and a boss cover made according to the present invention.
Figure 4:
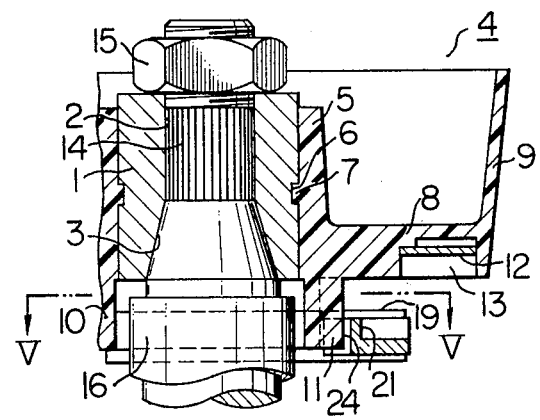
FIG. 4 is generally similar to FIG. 3 but also illustrates a steering shaft secured to the steering wheel boss shown in FIG. 3.
Figure 5:
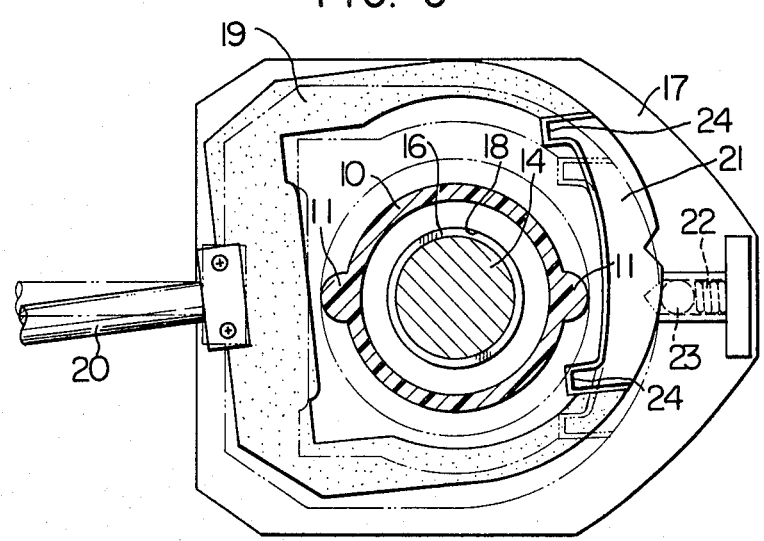
FIG. 5 is a section taken on line V—V in FIG. 4.

Referring first to FIGS. 3 to 5, a boss 1 of a steering wheel (not shown) is a die-cast product of aluminium or aluminium-magnesium alloy and has a generally cylindrical peripheral wall thinner than that of a conventional steering wheel boss. The boss 1 is formed therein with an axial bore 2 and a tapered hole 3 continuously or smoothly connected thereto. A boss cover 4 of a plastic material is molded in such a manner that the boss 1 is placed in a mold as an insert and the plastic material is cast onto the insert. The boss cover 4 includes a generally cylindrical inner wall 5 which is in close contact with the boss 1 and has a radially inwardly projecting annular protrusion 7 engaged with an annular groove 6 formed in the outer peripheral surface of the boss 1. The boss cover 4 further includes an outer peripheral wall 9 spaced from the inner wall 5 and connected thereto by an annular flange portion 8 extending therebetween. Along the inner peripheral edge of the annular flange portion 8, an integral annular reinforcing wall 10 is formed on and downwardly extends from the bottom surface of the flange portion 8. A pair of projections or axial ridges 11 are formed integrally with the outer peripheral surface of the annular reinforcing wall 10 and are disposed thereon at diametrically opposite points. The axial ridges 11 are also integral with the bottom surface of the annular flange portion 8 and will be termed hereunder as "cam actuating portions" for the reason to be made apparent later. An annular groove 13 is formed in the bottom surface of the flange portion 8 radially outwardly of the cam actuating portions 11 and accommodates a slip ring 12.

The assembly of the steering wheel boss 1 and the boss cover 4 is mounted on the steering shaft 14 and secured thereto by means of a nut 15 in conventional manner. The steering shaft 14 extends through a steering column 16.

A turn indicator switch base 17 is fixed to the column 16 which extends through an axial bore 18 formed in the base. A bracket 19 surrounds the column 16 and is pivotally mounted on the base 17. The bracket 19 carries a lever 20 rigidly connected to one side edge of the bracket and a generally arcuate cam 21 secured to the diametrically opposite side edge of the bracket. The cam 21 has an arcuate outer edge against which a ball 23 is resiliently urged by a compression spring 22 mounted on the base 17. The bracket 19 is rotatable relative to the base 17 about an axis of rotation which is not shown but is disposed adjacent to the junction between the bracket 19 and the lever 20. The cam 21 has a pair of crests 24 disposed at the opposite ends of the cam and extending radially inwardly beyond the inner periheral edge of the bracket 19. The bracket 19 is positioned with respect to the boss cover 4 such that the annular reinforcing portion 10 and the ridges 11 thereon are disposed between the column 16 and the bracket 19. The cam actuating portions 11 are movable by the rotation of the steering wheel along a predetermined circular path into which either of the crests 24 of the cam 21 can be moved by the operation of the lever 20.

In operation, when the lever 20 is operated to rotate the bracket 19 in one direction about its axis of rotation, one of the crests 24 of the cam 21 is moved into the path of movement of the cam actuating portions 11. Then the steering wheel boss 1 is rotated in the same direction by rotation of the steering wheel to turn the car. When the turn of the car is finished, the steering wheel is rotated to the initial position. This returning rotation of the steering wheel moves the cam actuating portions 11 along their path of movement, so that one of the cam actuating portions 11 is moved into contact with said one crests 24 of the cam 21 whereby the cam is returned to its neutral position to cancel the turn signal.

It will be appreciated that, when the cam actuating portions 11 are brought into contact with the crests 24 of the cam 21, the portions 11 are neither broken nor bent because they are integral with the annular reinforcing portion 10 which is integral with and extends from the bottom surface of the boss cover 4. In addition, because the cam actuating portions 11 are formed integrally with the boss cover 4 rather than being fabricated separately of the boss cover, the cam actuating portions 11 can be correctly positioned and directed with respect to the cam 21 and thus can provide a reliable cancellation operation.

Figure 6:
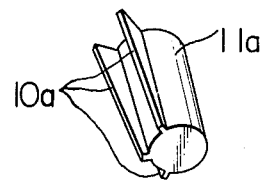
FIG. 6 is a perspective view of another embodiment of a cam actuating portion of the boss cover.
Figure 7:
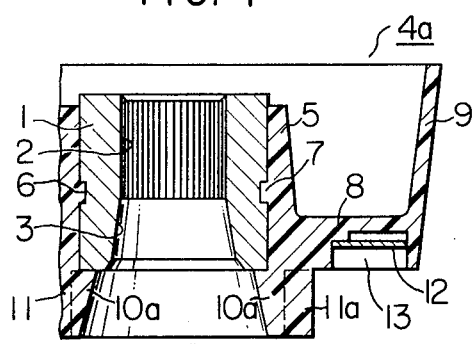
FIG. 7 is a fragmentary sectional view of the boss cover having the other embodiment of the cam actuating portion shown in FIG. 6.

FIGS. 6 and 7 show a second embodiment of the present invention, in which parts similar to those of the first embodiment are designated by similar reference numerals. The embodiment includes a modified boss cover 4a which includes a pair of cylindrical projections 11a extending from the bottom surface of an annular flange portion 8. The projections 11a are integral with the boss cover 4a and disposed at diametrically opposite points with respect to the axis of the boss cover 4a. Downwardly converging triangular reinforcing ribs 10a are formed integrally with the bottom surface of the boss cover 4a and the cylindrical projections 11a and disposed generally radially inwardly of the projections with respect to the axis of the boss cover 4a. The other parts of the embodiment shown in FIGS. 6 and 7 are identical in structure and function with those of the embodiment shown in FIGS. 3-5.

Figure 8:
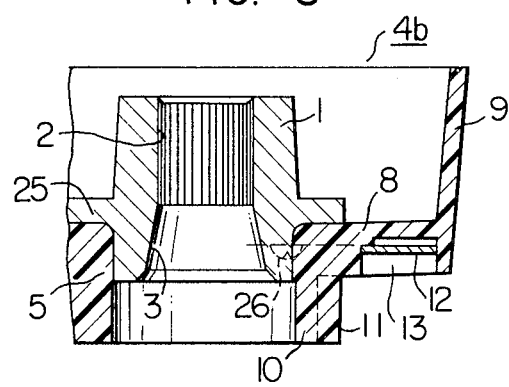
FIG. 8 is a fragmentary axial sectional view of a further embodiment of the boss cover.
Figure 9:
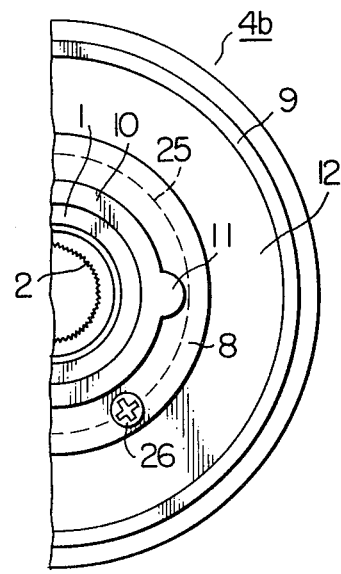
FIG. 9 is a bottom view of the boss cover shown in FIG. 8.

FIGS. 8 and 9 show a third embodiment of the invention in which the boss 1 has a radially outwardly extending flange 25 integral with the boss 1. A boss cover 4b has its inner peripheral wall 5 snugly received on the outer peripheral surface of the boss 1 below the flange 25. The upper surface of the annular flange portion 8 is in abutment contact with the bottom surface of the flange 25 of the boss 1. Screws 26 are used to secure the boss cover 4b to the boss 1.

As will be seen from the foregoing description, the boss cover of a plastic material made according to the present invention includes integral cam actuating portions adapted to be moved into contact with the crests of the cam to return the cam to its initial or neutral position. This integral plastic structure not only eliminates the use of the cam actuating pin k of the prior art, but also allows the steering wheel boss to be small-sized and light-weighted. In addition, the cam actuating pin k of the prior art was made from a metal and tended to spoil other steering wheel assemblies during transportation. In order to protect the steering wheel assemblies during transportation, therefore, the cam actuating pins had to be covered with a soft meterial such as plastic tubings during transportation. However, the cam actuating portions made according to the present invention are made of a plastic material and thus do not need such soft coverings. Moreover, the cam actuating portions according to the present invention are integral with the boss cover and thus can be accurately positioned with respect to the signal cancellation cam to provide a reliable cam actuating operation. The steering wheel boss to which the boss cover according to the present invention is secured is not formed with any pin-receiving hole and, accordingly, can be free from the formation of cracks. The cam actuating portions are reinforced by the reinforcing portion which is integral with the boss cover and with the cam actuating portions. Thus, the cam actuating portions are provided with increased mechanical strengths. Furthermore, the first embodiment wherein the reinforcing portion is in the form of an annular wall 10 provides advantages that the bottom surface of the annular wall can be utilized as a reference surface for the examination of dimensions of a serrated portion of the axial bore 2 of the boss 1 and the dimensions of the tapered inner surface 3 thereof and that the quality control can be easily performed because the cam actuating portions 11 are integral with the reinforcing annular portion 10.

What is claimed is:

1. A turn signal cancellation apparatus for use with a steering wheel and shaft assembly having a steering wheel boss to which the steering shaft is secured, said apparatus comprising a boss cover of a plastic material extending around said steering wheel boss and secured thereto, said boss cover including a surface portion extending transversly with respect to said boss and a turn signal cancellation cam, said boss cover including at least one cam actuating portion integral with said cover and extending from said surface portion thereof and a reinforcing portion disposed substantially radially inwardly of said cam actuating portion and extending from said surface portion of said boss cover, said reinforcing portion being integral with said boss cover and said cam actuating portion, said cam actuating portion being movable along a circular path about the axis of said steering shaft when said steering wheel is rotated, said cam having at least one contact portion and being operable by a turn indicator lever means so that said contact portion is moved into the path of movement of said cam actuating portion of said boss cover whereby said cam can be returned to its initial neutral position by engagement of said cam actuating portion with said contact portion of said cam.

2. A turn signal cancellation apparatus as claimed in claim 1, wherein said boss cover is formed by casting the plastic material in molten state onto said steering wheel boss, said steering wheel boss and boss cover thereby forming a unitary structure.

3. A turn signal cancellation apparatus as claimed in claim 2, wherein said boss cover includes a substantially cylindrical inner portion engaged with the outer peripheral surface of said steering wheel boss and said surface portion is an annular flange portion integral with said cylindrical portion and radially outwardly extending therefrom, and wherein said reinforcing portion comprises an annular wall extending from the bottom surface of said flange portion and said cam actuating portion comprises an axial ridge extending axially from the bottom surface of said flange portion and also extending radially outwardly from the outer peripheral surface of said annular wall.

4. A turn signal cancellation apparatus as claimed in claim 2, wherein said boss cover includes a substantially cylindrical inner portion engaged with the outer peripheral surface of said steering wheel boss and said surface portion is an annular flange portion integral with said cylindrical portion and radially outwardly extending therefrom, and wherein said cam actuating portion comprises a substantially cylindrical projection extending from the bottom surface of said annular flange portion and said reinforcing portion comprises at least one reinforcing rib integral with the bottom surface of said annular flange portion and the peripheral surface of said projection and disposed generally radially inwardly of said projection with respect to the axis of said boss cover.

5. A turn signal cancellation apparatus as claimed in claim 1, wherein said steering wheel boss includes a radially outwardly extending annular flange portion and wherein said boss cover includes an annular portion defining therein a central axial opening having an inner peripheral surface engaged with the outer peripheral surface of said steering wheel boss, said annular portion having its upper surface engaged with the bottom surface of said annular flange portion of said steering wheel boss.

6. A turn signal cancellation apparatus as claimed in claim 5, wherein said reinforcing portion comprises an annular wall extending from the bottom surface of said annular portion of said boss cover and said cam actuating portion comprises an axial ridge extending axially from the bottom surface of said annular portion and also extending radially outwardly from the outer peripheral surface of said annular wall.

* * * * *